Patented Oct. 18, 1932

1,883,122

UNITED STATES PATENT OFFICE

DAVID TRAILL, OF SALTCOATS, SCOTLAND, ASSIGNOR TO E. I. DU PONT DE NEMOURS & COMPANY, OF WILMINGTON, DELAWARE, A CORPORATION OF DELAWARE

BENZYL CELLULOSE

No Drawing. Application filed February 15, 1930. Serial No. 428,856, and in Great Britain February 20, 1929.

This invention relates to cellulose derivatives, and more especially to aralkyl celluloses generally, for example benzyl cellulose, with reference to which latter body the invention will be more particularly described.

In investigations on benzyl cellulose, particularly in connection with lacquer production, I have found that the normal type of benzyl cellulose gives somewhat opalescent solutions, and that lacquers made from these solutions dry with a matt surface. While such a surface can be used, an effort has been made to obtain water clear solutions which would dry and give a highly glossy surface.

I have investigated the cause of the opalescence and have found that it appears to be due to the presence of cellulose ethers which are less degraded than the bulk of the benzyl cellulose. It has also been found that many of the solutions are of such high viscosity as to render them unsuitable for use in lacquers. The present process provides a method of modifying benzyl cellulose of high viscosity, so that there is a sufficient lowering of viscosity to make the benzyl cellulose suitable for use in lacquers.

Among the objects of the present invention are to provide a method for the modification of benzyl cellulose that will give clear solutions from which lacquers may be obtained that will dry with a highly polished surface, and at the same time be soluble in cheap solvents, and to provide lacquers and the like which may be made by the processes generally used or their equivalents.

These objects are accomplished by the treatment of benzyl cellulose, or other aralkyl celluloses, which are wholly or partially insoluble in the usual solvents with benzyl chloride or other aralkyl halide and with water and steam at normal or increased pressure. If the reaction mass from the benzylation of cellulose contains benzyl chloride, it may be sufficient to digest in water and/or steam, but if the reaction mass does not contain appreciable quantities of benzyl chloride the result can be obtained either by mixing in with a proper quantity of benzyl chloride and digesting with hot aqueous fluid.

In the benzylation of cellulose, cellulose is prepared, after the fashion set forth in British application No. 28,356 of 1928, by the action of benzyl chloride on alkali cellulose. This treatment consists in general in digesting cellulose with an alkali, such as sodium hydroxide, and with benzyl chloride. This, after digestion, contains a considerable quantity of benzyl chloride and certain undegenerated cellulose ethers which are rendered highly insoluble in ordinary solvents. In the practice of this invention, I first remove the benzyl chloride from the reaction mass until the reaction mass contains only between 3% and 40% of benzyl chloride or other aralkyl halide. It is to be understood that these limits are not definite limits but constitute a range of concentrations within which excellent results are obtained. After the purification the reaction mass is treated in an autoclave with water and steam.

In case the benzyl cellulose has been purified until it is substantially free from benzyl chloride, it can be treated with an acid, such as hydrochloric acid, and it will be found that the benzyl cellulose has been changed into a soluble form having improved viscosity.

The reason for the result has not been determined beyond controversy, but at present the favored theory is that the digestion of the mass containing benzyl chloride with water results in hydrolyzing the benzyl chloride with a consequential liberation of hydrochloric acid which performs the functions of degenerating the undegenerated ethers, lowering the viscosity, and increasing the solubility. This theory is supported by the fact that the treated benzyl cellulose, which originally contained benzyl chloride, is found to contain dibenzyl ether but no benzyl chloride. This results from the condensation of benzyl alcohol with benzyl chloride, hydrochloric acid being liberated. When the modified benzyl cellulose is being used for lacquers, the dibenzyl ether may be left in; it then functions as a plasticizer.

The following example illustrates a particular method by which the invention may be carried into effect. This example is to be deemed illustrative only and not in any sense limitative.

Example 1

A benzyl cellulose reaction mass, containing 3% to 40% benzyl chloride, but preferably 20% benzyl chloride, is treated in an autoclave with ten to twenty times its weight of water, and with steam, at a pressure of 50 lbs. per square inch for one hour. The product is a creamy spongy mass, which is in the form of a soft paste, because of the thermo-plasticity of benzyl cellulose. This mass hardens on cooling, and may be ground to a fine powder. It dissolves in mixtures of benzene spirits, xylene spirits and the like. The viscosity is reduced, and the solutions are clear.

The treatment of benzyl cellulose or the like according to the present invention may be modified according to the nature of the benzyl cellulose or the like, or the degree of insolubility of that body, and according to the product desired. This treatment may also be employed to reduce the viscosity of the benzyl cellulose solution. The time of heating and the steam pressure employed may be varied according to the amount of benzyl chloride present, and according to the viscosity or solubility of the benzyl cellulose desired.

The terms "soluble" and "insoluble" benzyl celluloses, or the like, used above refer to benzyl celluloses which are soluble or insoluble in mixtures of 80 parts by volume of toluene, benzene, or xylene and 20 parts by volume industrial spirits, and similar cheap solvents or mixtures of solvents.

The term "aqueous fluid" as used in the claims and specification is intended to include fluids whether of pure or of acidulated character, and whether in the gaseous or fluid state.

The present invention includes benzyl celluloses and other cellulose ethers in general, and in particular, special benzyl celluloses manufactured by the process described in copending British application No. 28,356 of 1928.

Among the advantages of the process are an improved product having more complete solubility in inexpensive solvents, and a new product having low viscosity.

As many apparently widely different embodiments of this invention may be made without departing from the spirit and scope thereof, it is to be understood that I do not limit myself to the specific embodiments thereof except as defined in the appended claims.

I claim:

1. Method of treating benzyl cellulose containing a benzyl halide which comprises digesting same with steam to reduce the viscosity characteristics and increase the solubility of the benzyl cellulose in the usual solvents therefor.

2. Method of treating benzyl cellulose containing from 3 to 40% benzyl chloride which comprises digesting same with steam at approximately 50 pounds per square inch pressure to reduce the viscosity characteristics and increase the solubility of the benzyl cellulose in the usual solvents therefor.

3. Method of treating benzyl cellulose containing about 20% benzyl chloride which comprises digesting same with 10 to 20 times its weight of steam at approximately 50 pounds per square inch pressure for approximately one hour to reduce the viscosity characteristics and increase the solubility of the benzyl cellulose in the usual solvents therefor.

In testimony whereof, I affix my signature.

DAVID TRAILL.